US012647538B2

(12) United States Patent
Loccisano

(10) Patent No.: US 12,647,538 B2
(45) Date of Patent: Jun. 2, 2026

(54) VEHICLE-MOUNTED CAMERA NETWORK FOR SURVEILLANCE AND TRACKING

(71) Applicant: Vincent Loccisano, Wellesley, MA (US)

(72) Inventor: Vincent Loccisano, Wellesley, MA (US)

( * ) Notice: Subject to any disclaimer, the term of this patent is extended or adjusted under 35 U.S.C. 154(b) by 0 days.

(21) Appl. No.: 19/038,853

(22) Filed: Jan. 28, 2025

(65) Prior Publication Data

US 2025/0175580 A1     May 29, 2025

(51) Int. Cl.
| | |
|---|---|
| *H04N 7/18* | (2006.01) |
| *G06V 20/52* | (2022.01) |
| *G06V 20/58* | (2022.01) |
| *G06V 20/62* | (2022.01) |
| *G06V 40/16* | (2022.01) |

(52) U.S. Cl.
CPC ............. *H04N 7/181* (2013.01); *G06V 20/52* (2022.01); *G06V 20/58* (2022.01); *G06V 20/625* (2022.01); *G06V 40/172* (2022.01); *G06V 2201/08* (2022.01)

(58) Field of Classification Search
None
See application file for complete search history.

(56) References Cited

U.S. PATENT DOCUMENTS

| | | | | |
|---|---|---|---|---|
| 11,829,959 | B1 * | 11/2023 | Latif ...................... | G05D 1/104 |
| 2017/0075888 | A1 * | 3/2017 | Ekin ...................... | G06V 20/56 |
| 2023/0053199 | A1 * | 2/2023 | Goodnight ........... | G06Q 10/087 |
| 2023/0334672 | A1 * | 10/2023 | Itsumi .................... | G06T 7/215 |
| 2025/0016261 | A1 * | 1/2025 | Strzelczyk ........ | H04M 1/72412 |

* cited by examiner

*Primary Examiner* — Eileen M Adams
(74) *Attorney, Agent, or Firm* — Keeley DeAngelo LLP; W Scott Keeley

(57) ABSTRACT

An example embodiment is a system of network-capable cameras and/or sensors in vehicles in combination with a network that communicates and manages data from multiple vehicle's cameras and/or sensors to provide a comprehensive surveillance network. In some embodiments vehicle sensors and/or cameras communicate anonymously with electronic devices in range of short-range wireless communication protocols to relay the information to the network. Vehicles may be occupied or unoccupied, moving or parked, powered or unpowered. This dynamic surveillance network aids authorities and safety personnel in tracking vehicles and individuals in real-time. In some embodiments vehicle cameras and/or sensors are equipped with license plate reader technology and facial recognition technology.

10 Claims, 3 Drawing Sheets

100

<u>100</u>

<u>200</u>

VEHICLE-MOUNTED CAMERA NETWORK FOR SURVEILLANCE AND TRACKING

TECHNICAL FIELD

The present disclosure relates generally to the field of surveillance and tracking systems and specifically to a combination of conventional vehicle mounted sensors and/or cameras, anonymous wireless communication with electronic devices, and mobile data networks to provide a system for surveillance and tracking of vehicles and individuals.

BACKGROUND OF THE INVENTION

Modern vehicles are equipped with cameras and sensors that serve various purposes. These sensors and cameras are configured to enhance safety and provide driver assistance. Increasing prevalence of these cameras and sensors provides safer and more automated driving while conveying valuable information to the driver and to the vehicle's onboard systems.

Common sensors include driver-gesture detection, blind-spot and rear-view proximity sensors. These sensors detect the presence and distance of objects by emitting infrared light and detecting the reflected light to track the position and movement of objects. They can be used with cameras or independently. Infrared sensors are less susceptible to lighting conditions than cameras alone. Additional sensors may include wireless connectivity, sometimes referred to as Ultra Wiideband (UWB) and Bluetooth connections, to devices such as AirTags or mobile electronic devices such as phones, watches or tablets, of nearby passersby or vehicle operators.

Common cameras include forward-facing cameras, rearview cameras, side-view cameras and driver-mounted cameras. Currently, most vehicle cameras use Complementary Metal-Oxide-Semiconductor (CMOS) image sensors. CMOS sensors are compact, energy-efficient sensors that produce high-quality, high-resolution images. Some cameras may be equipped with infrared technology to improve image quality in low-light conditions. Image processing software interprets captured images to extract relevant information including object detection, lane recognition and traffic-sign identification.

Forward-facing cameras are commonly mounted to a vehicle's windscreen, near the rearview mirror. Images from forward-facing cameras capture a wide view of the road ahead of the vehicle. The images are interpreted by image-processing software that informs Advanced Driver Assistance Systems (ADAS), identifying objects, lane markings and traffic signs.

Rearview cameras are commonly mounted to the rear of the vehicle near a license plate. These cameras capture images of the area behind the vehicle and are intended to assist with parking and avoiding obstacles when driving in reverse.

Side-view cameras, usually located on side mirrors or low on the side of a vehicle, capture images of a vehicle's sides. These are interpreted by image-processing software to alert a driver to objects in the vehicle's blind spot, when changing lanes or parking and maneuvering in tight spaces. Images from forward-facing, rearview, and side-view cameras may be combined to create a 360° view of the vehicle's surroundings.

Driver-monitoring cameras, located on the steering column or dashboard, face the driver. They are equipped with infrared or other technologies to track the driver's eye movements, head position and other indicators, all of which may be used to determine whether a driver is alert and watching the road.

Geofencing uses GPS, RFID, Wi-Fi or cellular data to create a virtual geographic boundary. When a device or vehicle enters or exits this defined area (referred to as the geofence), a pre-programmed action is triggered. This action may be anything from sending a notification to a smartphone, activating an alarm, or automatically controlling a communication network, camera or other device.

Airtags are tracking devices that work by a combination of technologies. Airtags emit a Bluetooth signal that can be detected by nearby, similar devices that are part of a generic network. Ultra-wideband (UWB) is a type that offers precise location information and direction to the location of the airtag. An airtag constantly sends out a Bluetooth signal, which is picked up by nearby devices. The location of the airtag is relayed anonymously to the network. Location data is encrypted and anonymous, so the identity of the devices that are used to transmit information are not known. In essence, airtags leverage a network of devices to create a crowd-sourced network.

SUMMARY OF THE INVENTION

An example embodiment is a dynamic surveillance network that may aid authorities and safety personnel in tracking vehicles and individuals in real time. It employs a system of network-capable cameras and/or sensors in vehicles, in combination with a network of electronic devices, to communicate, through wireless networks such Bluetooth and ultra-wideband, and manage imagery and or data from multiple vehicles' cameras and sensors to comprise a comprehensive surveillance network.

Images from forward-facing cameras, rearview cameras, side-view cameras, and driver-mounted cameras may be collected and arranged to produce a 360° view of a vehicle. These cameras are equipped with license-plate reader technology and facial-recognition technology. Multiple vehicles communicating with a central processor provide a surveillance network that changes in size and location in real-time.

In an example embodiment a surveillance system uses wireless connectivity between vehicle mounted sensors and a central processing unit that is configured to receive signals from the vehicle mounted sensors and processes the signals through an application. The application monitors signals from a number of vehicle's sensors to compare sensor data with data relating to vehicles or persons, of interest. When a person or vehicle of interest is detected, the location of the vehicle and sensor that detected the person or vehicle of interest is used to define a surveillance area. A geofence is set up surrounding the surveillance area. Signals are continuously processed and the geofencing is updated as the person or vehicle of interest moves.

In some embodiments sensors are network-capable and are wirelessly connected to cellular networks. In other embodiments sensors communicate with electronic devices within the range of wireless connectivity technology. Signals from sensors are sent anonymously through wireless connectivity through electronic devices in range, and on to a central processing unit that monitors signals from any number of vehicle sensors.

Sensors including driver-gesture detection and blind-spot and rear-view proximity sensors may be configured to track the position and movement of a vehicle, a driver, or a person under surveillance in range of the sensors. Each vehicle camera and sensor is registered in a network, providing real-time location and video-feed data.

Vehicles equipped with network-capable cameras and sensors can be dynamically added to a network based on their proximity to an event or area of interest. In this example, upon entering a predefined geofenced area, some or all of a vehicle's cameras and/or sensors may be automatically registered and activated in the network. These same cameras may be deactivated upon leaving the predefined geofenced area.

DETAILED DESCRIPTION

Figure 1:
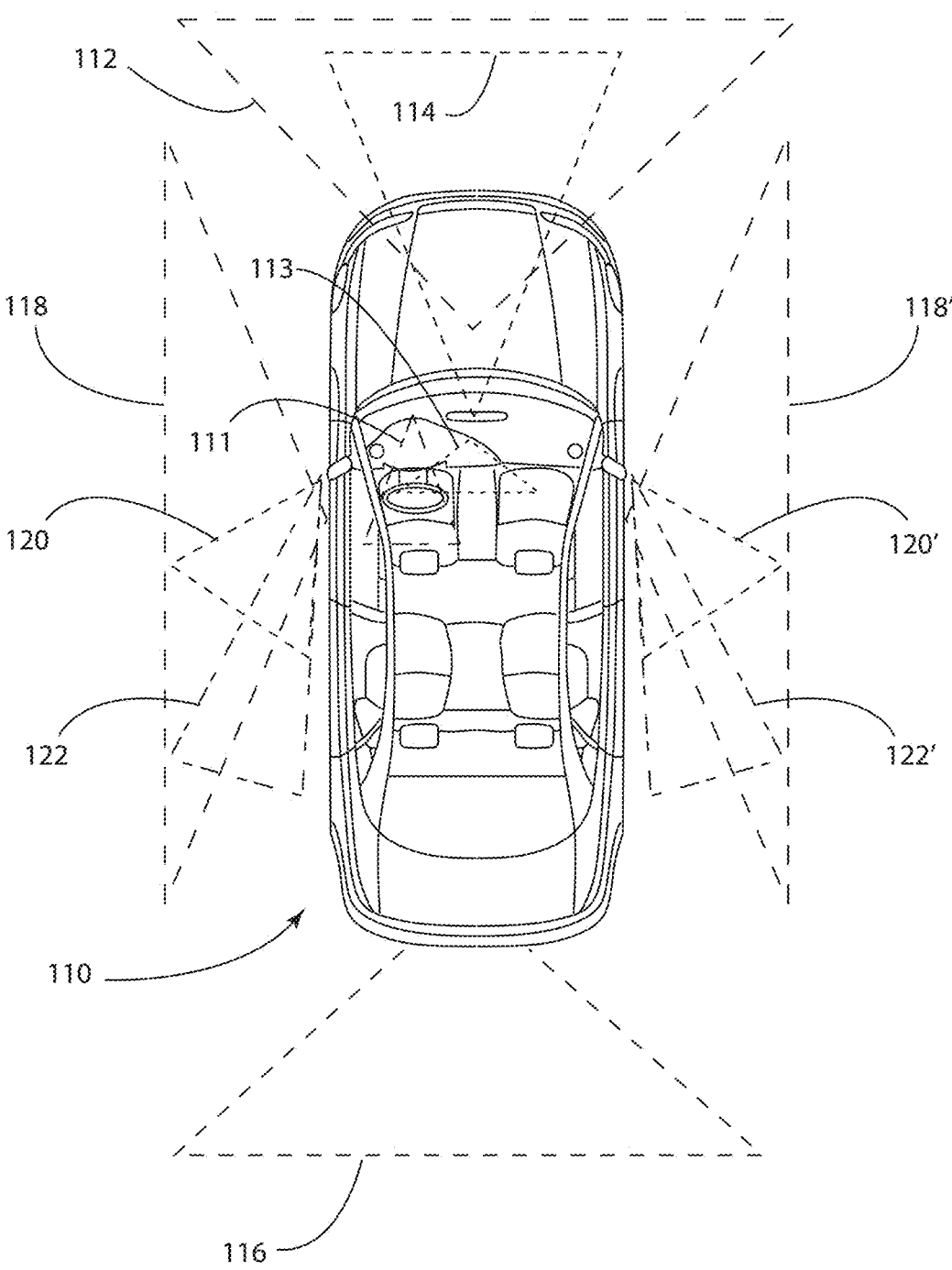
FIG. 1 is a top view of a vehicle equipped with network-capable cameras and sensors.

FIG. 1 is a top view of a vehicle equipped with network-capable cameras and sensors. Cameras and sensors are illustrated by their field of view. A vehicle 110 has a forward-facing camera 112 that captures the forward part of a surrounding view. The surrounding view is further supported by a left side-camera 118 and right side-camera 118'. A left blind-spot sensor 120 and a right blind-spot sensor 120' detect vehicles in a blind spot. A left-mirror replacement camera 122 and a right-mirror replacement camera 122' capture a similar field of view as would a rear-view mirror. When used for surveillance, the blind-spot sensors work together with the mirror-replacement cameras to record vehicles in the driver's blind spot. A rear-view camera 116 captures an area behind the vehicle which may include obstacles or vehicles.

In some embodiments signals from sensors are anonymously and wirelessly communicated to an electronic device 115 that in turn relays the signals to a central processing unit for processing and surveillance. In other embodiments signals from cameras are anonymously and wirelessly communicated to an electronic device 115 that in turn relays the signals to a central processing unit for processing and surveillance. The electronic device illustrated is a cell phone, however one skilled in the art understands that smart watches, tablets, laptops and the like are commonly equipped with wireless and network-capable technology and are capable of wirelessly and anonymously transmitting signals transmitting information such as LPR and facial recognition data. Anonymous, wireless communication with electronic devices within the range of short-range wireless communication such as bluetooth and UWB allow for parked vehicles, stationary vehicles and moving vehicles to transmit data gathered from sensors, to a central processing unit for processing and surveillance.

Interior-view cameras include an interior-vision camera 111, a gesture-detection sensor 113 and a drive recorder (also referred to as a dashcam) 114. The combination of cameras and sensors with a centralized network provides a dynamic surveillance system.

Vehicle cameras are equipped with license-plate reader technology, which enables them to automatically capture and read license plates of vehicles within their field of view. The license-plate data is transmitted through the centralized network to a central processing unit (CPU). Captured license-plate numbers are processed in the CPU using optical character recognition (OCR) to convert the license-plate images to text data. This data is then matched against a database of registered vehicles, stolen vehicles or vehicles of interest (hereinafter referred to as vehicles of interest). The location of vehicles equipped with cameras and sensors, registered in the system, are continuously monitored to update the scope of the geographic area under surveillance. This allows authorities to track the movement of specific vehicles across regions and jurisdictions.

Figure 2:
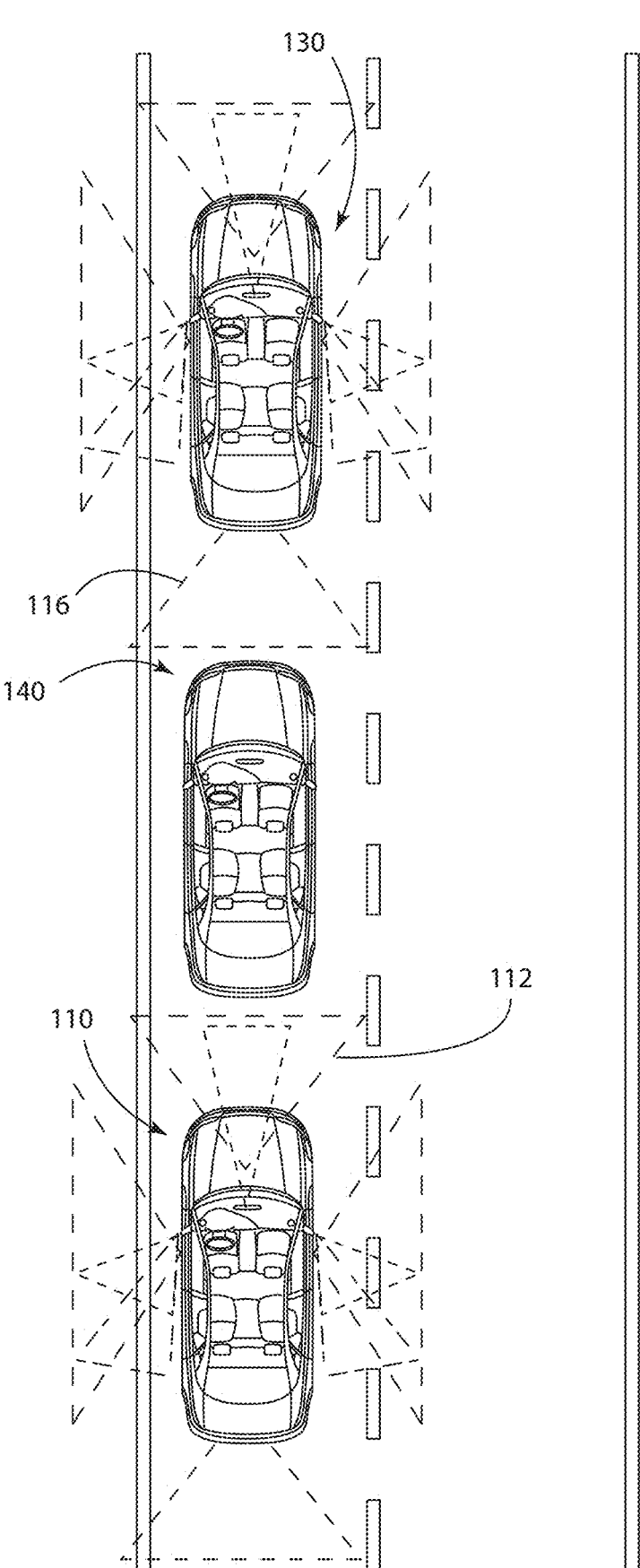
FIG. 2 is a top view depicting a number of vehicles equipped with network-capable cameras and sensors and a vehicle being surveilled.

FIG. 2 illustrates an example use of the embodiment. The system generates alerts and notifications when a vehicle of interest is detected by any of the cameras that are registered in the network. In this example, a license plate of a vehicle 140 is within the field of view of the forward-facing camera 112 of a vehicle in the network 110. The license plate is recognized by the LPR technology. The GPS location of the vehicle in the network 110, along with the LPR result, is sent through an available connection such as Wi-Fi or cellular data to the CPU, where the captured license-plate number is processed using OCR to convert the image to text. The text data is then matched against a database of registered vehicles, stolen vehicles or vehicles of interest. In an example embodiment, the vehicle 140 is determined to be a vehicle of interest 140, wherein the GPS location of the first vehicle 110 is recorded. A nearby second vehicle 130, registered in the network, is activated. The vehicle of interest 140 is within the field of view of the rear-view camera 116 of the second vehicle. The rear-view camera 116 captures an image of the driver of the vehicle of interest 140 wherein the image is sent to the CPU and the system processes the facial image to match it against a database of known individuals. Authorities may further create a geofenced area in the vicinity of these vehicles, activating vehicles in the geofenced area to create a moving, dynamic surveillance network.

Figure 3:
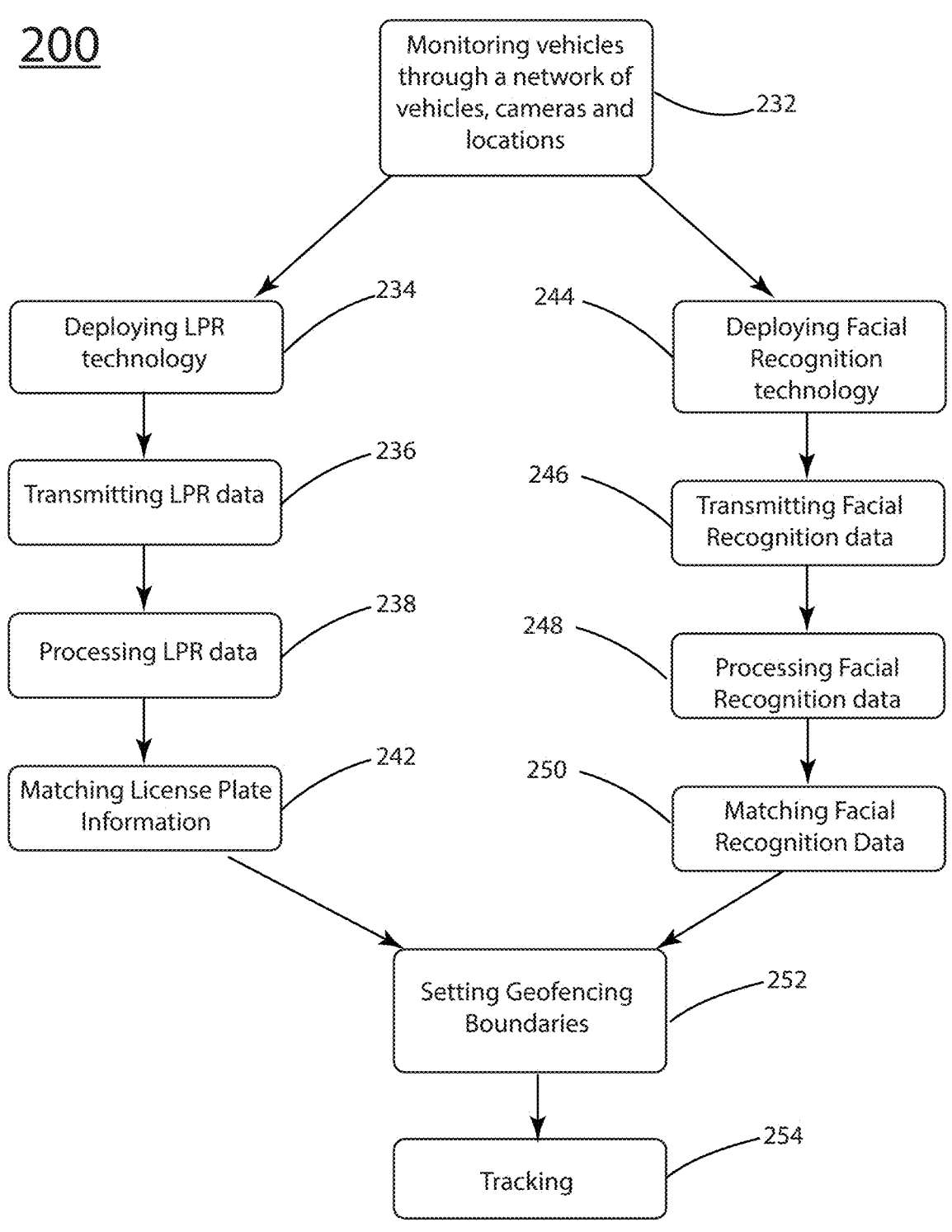
FIG. 3 is a diagram illustrating a method of using the system of FIG. 1.

FIG. 3 is a diagram illustrating a method 200 of using the embodiment of FIG. 1 and FIG. 2. The method begins by monitoring vehicles through a network of vehicle cameras and locations 232 that are registered with the system. In one aspect, the method proceeds by deploying LPR technology 234 and then transmitting the LPR data 236 to a CPU. This data may be transmitted wirelessly and anonymously to nearby electronic devices and then relayed to the CPU. The method continues by processing the LPR data 238 in the CPU and then by matching license-plate information 242 with that of vehicles of interest. When a vehicle of interest is located, the method continues by setting geofencing boundaries 252 and tracking 254 the vehicle of interest, using registered vehicles, cameras and sensors in the geofenced area. The geofence is reset as the vehicle or person of interest moves.

In another aspect of the method 200, the method proceeds by deploying facial-recognition technology 244 then transmitting that data 246 to a CPU. The method continues by processing 248 facial-recognition data in the CPU and then that data 250 to persons of interest. When a person of interest is located, the method continues by setting geofencing boundaries 252 and tracking the individual 254.

Alerts and notifications may be sent to law-enforcement agencies. In some embodiments, historical data is analyzed to maintain a record of license-plate readings, enabling retrospective analysis of vehicle movements. The data analysis is useful for investigations, and for creating movement patterns of vehicles over time.

In some embodiments, the system is used for an event rather than to track a person or vehicle. The system includes prioritization protocols to determine which cameras or sensors should be activated according to factors such as proximity to the event, camera resolution and network load. This ensures optimal resource use and coverage.

In some embodiments, vehicles, cameras and sensors may be dynamically added or removed from an active tracking system. Vehicles equipped with network-capable cameras may be dynamically added to the network according to their proximity to an event or area of interest. As a vehicle enters a geofenced area, its cameras may be automatically registered and activated within the network. Vehicles may also be dynamically removed from the network as they leave the geofenced area. A vehicle's cameras may be automatically deregistered from the network as the vehicle exits a designated proximity or geofenced area, ensuring that only relevant data is collected.

One skilled in the art understands that the network may use encrypted transmission of data, restricting access to authorized personnel only. Further, privacy safeguards may be implemented to protect individuals' personal data and to ensure compliance with legal and ethical standards.

The invention claimed is:

1. A surveillance system comprising: wireless connectivity between a plurality of vehicle mounted sensors, a plurality of vehicle mounted cameras; and a central processing unit; and said central processing unit configured to receive signals from said plurality of vehicle mounted sensors and vehicle mounted cameras; and said central processing unit storing instructions for processing said signals, providing for surveillance of an area defined by, and surrounding, the location of said vehicle mounted sensors and vehicle mounted cameras, the area expanded to a geofenced area and further defined by a last known position of the location of said vehicle mounted sensors and cameras, and wherein the last known position of the location of said vehicle mounted sensors and cameras is based on LPR technology.

2. The surveillance system of claim 1 further comprising:
anonymous wireless connectivity from said plurality of vehicle mounted sensors and cameras, transmitted through wireless devices to said central processing unit.

3. The surveillance system of claim 1 wherein:
the signals and processing thereof may only be authorized by a federal or governmental agency.

4. The surveillance system of claim 1 further comprising:
LPR technology electronically coupled with each of said plurality of vehicle mounted cameras; wherein license plates within the field of view of said plurality of vehicle mounted cameras are read by said license plate reading technology and converted to data; wherein said data is sent to said central processing unit for processing to text data that may be sent to authorities for matching to vehicles of interest.

5. The surveillance system of claim 1 further comprising:
facial recognition technology electronically coupled with each of said plurality of vehicle mounted cameras; wherein
faces within the field of view of said plurality of vehicle mounted cameras are recorded by said facial recognition technology and converted to data; wherein said data is sent to said central processing unit for processing, the results of which may be sent to authorities for matching to persons of interest.

6. The surveillance system of claim 1 further comprising:
instructions for tracking a specific vehicle are included in said instructions; wherein said plurality of vehicle mounted cameras and sensors on nearby vehicles may be focused on said specific vehicle.

7. A surveillance system comprising:
wireless connectivity between a plurality of vehicle mounted sensors, a plurality of vehicle mounted cameras; and a central processing unit; and
said central processing unit configured to receive signals from said plurality of vehicle mounted sensors and vehicle mounted cameras; and
said central processing unit storing instructions for processing said signals, providing for surveillance of an area defined by, and surrounding, the location of said vehicle mounted sensors and vehicle mounted cameras, the area expanded to a geofenced area and further defined by a last known position of the location of said vehicle mounted sensors and cameras, and wherein
the last known position of the location of said vehicle mounted sensors and cameras is based on facial recognition data.

8. A method for operating the surveillance system of claim 7, the method comprising:
monitoring vehicles through a network of vehicle's cameras and sensors; and
deploying LPR technology using the sensors and cameras of at least one vehicle; and
transmitting LPR data to said central processing unit; and
processing LPR data by matching license plate information with license plate information of vehicles of interest; and
identifying a vehicle of interest; and
setting a geofencing boundary surrounding a location of said vehicle of interest; and
tracking said vehicle of interest with said network of vehicle's cameras and sensors.

9. The method of claim 8 further comprising:
evaluating said geofencing boundary according to a location of most recent transmittal of signals from said plurality of vehicle mounted sensors; and
resetting said geofencing boundary according to said location of most recent transmittal.

10. The method of claim 8 further comprising:
deploying facial recognition technology using the sensors and cameras of at least one vehicle; and
transmitting facial recognition data to said central processing unit; and
processing facial recognition data by matching said facial recognition data with an identity of a person of interest; and
setting a geofencing boundary surrounding a location of said person of interest; and
tracking said person of interest with said network of vehicle's cameras and sensors.

* * * * *